UNITED STATES PATENT OFFICE.

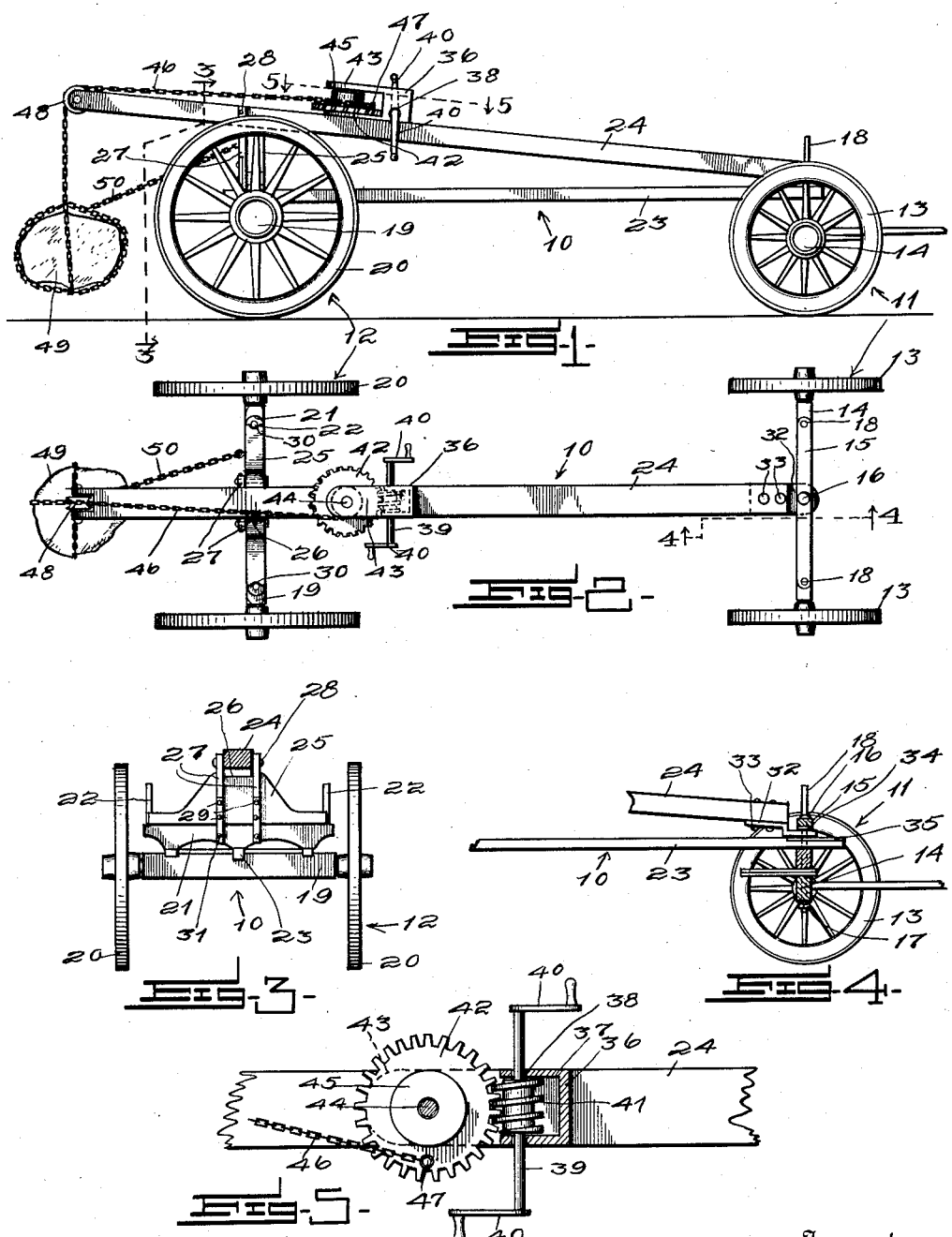

ALBERT C. BURLINGAME, OF MANDAN, NORTH DAKOTA.

HOISTING MECHANISM.

1,113,408. Specification of Letters Patent. Patented Oct. 13, 1914.

Application filed February 6, 1914. Serial No. 816,990.

*To all whom it may concern:*

Be it known that I, ALBERT C. BURLINGAME, a citizen of the United States, residing at Mandan, in the county of Morton and State of North Dakota, have invented certain new and useful Improvements in Hoisting Mechanism, of which the following is a specification.

My invention relates to improvements in apparatus for removing stones, logs, or other obstructions or loads, from roads, fields, or the like, and has particular reference to means of this character embodying a hoisting mechanism adapted to be preferably detachably mounted upon a wheeled vehicle or wagon, such as the ordinary "farmer's" wagon without materially altering the construction thereof.

An important object of the invention is to provide means whereby the ordinary wagon, such as a "farmer's" wagon, may be used as a traveling hoisting apparatus for elevating and conveying heavy stones, logs or the like, or in the capacity of an ordinary wagon.

A further object of the invention is to provide hoisting mechanism of the above mentioned character, which is extremely simple in construction, inexpensive to manufacture, strong, and durable.

A further object of the invention is to provide simple and reliable means for detachably connecting the hoisting mechanism with the forward and rear trucks of the wagon.

Other objects and advantages of the invention will be apparent during the course of the following description.

In the accompanying drawings forming a part of this specification and in which like numerals are employed to designate like parts throughout the same, Figure 1 is a side elevation of the apparatus embodying my invention, showing the same applied to a wagon, Fig. 2 is a plan view of the same, Fig. 3 is a transverse section, taken on line 3—3 of Fig. 1, Fig. 4 is a detail section, taken on line 4—4 of Fig. 2, showing the manner in which one end of the hoisting mechanism is connected with the king-bolt of the wagon, and, Fig. 5 is an enlarged horizontal section, taken on line 5—5 of Fig. 1.

In the drawings, wherein for the purpose of illustration is shown a preferred embodiment or form of my invention, the numeral 10 designates a wagon as a whole, of any well known or preferred type, preferably of the type known as the ordinary "farmer's" wagon. The wagon comprises forward and rear trucks 11 and 12. The forward truck includes wheels 13, carried by an axle 14, upon which is arranged a forward bolster 15. This bolster is pivotally connected with the forward axle by a preferably removable king-bolt 16, preferably held in place by a nut 17, arranged upon the lower end thereof. The forward bolster 15 is provided at its ends with stacks or standards 18, to receive the wagon body, as is customary. The rear truck comprises an axle 19, carrying wheels 20. Rigidly mounted upon this axle is a rear bolster 21, provided at its opposite ends with stacks or standards 22, to receive a wagon body as is customary. The rear bolster is connected with a pole or reach 23, the forward end of which is connected with the forward truck by being apertured for receiving the king bolt 16, which is the ordinary wagon construction. As no claim is made to the wagon *per se*, but only in combination with my improved hoisting mechanism, it is thought that no further detail description of the wagon is necessary, it being understood that various different types of wagons may be advantageously used with my hoisting mechanism.

My hoisting mechanism, in its preferred form or embodiment, comprises a preferably normally inclined longitudinal beam or supporting element 24, adapted to be arranged above and to extend longitudinally of the wagon 10, with its rear end extending rearwardly beyond the rear wheels 20 for a substantial distance as shown, for a purpose to be more fully explained. This longitudinal beam or supporting element 24 has its rear end portion arranged upon a rear bolster-support 25, provided with a transverse groove 26, to receive the same. The beam or supporting element 24 is preferably connected with the bolster-support 25 or retained within the transverse groove 26 by means of vertical straps 27, connected with the beam by means of bolts 28 and with the bolster-support 25, by means of bolts 29, as shown. The bolster-support 25 is adapted to be removably arranged upon the rear bolster 21, and is preferably provided at its opposite ends with vertical grooves 30, to receive the stacks or standards 22, as shown. The bolster-support 25 is suitably held in place upon the rear bolster 21, by connecting the straps 27 with the bolster 21 through the medium of bolts 31.

It is to be understood that I do not wish to restrict myself to the precise means employed for detachably connecting the bolster-support 25 with the rear bolster 21, it being understood that any suitable form of detachable means, adapted to serve the purpose, may be employed.

I provide means for detachably connecting the forward end of the longitudinal beam or supporting element 24 preferably with the forward truck, such means comprising a bracket or plate 32, rigidly secured to the forward end of the beam or supporting element 24 by means of bolts 33. The bracket or plate 32 is apertured for the reception of the king bolt 16, and when in use, is preferably arranged between the forward bolster 15 and the forward end of the reach 23, there preferably being metallic plates 34 and 35, arranged above and below the bracket or plate 32, as shown.

Preferably arranged upon the upper side of the longitudinal beam or support is a housing 36, rigidly connected therewith by any suitable means. This housing 36, as more clearly shown in Fig. 5, has one end thereof preferably in the form of a closed shell 37, the opposite side walls of which are apertured, as shown at 38, for receiving a transversely extending rotatable operating shaft 39, to the opposite ends of which are rigidly connected manually operated cranks 40. Rigidly connected with the shaft 39 within the shell 37 is a worm 41, engaging an approximately horizontally arranged worm wheel 42, disposed between upper and lower spaced longitudinal portions 43 of the housing 36. This worm wheel is rotatably mounted upon a stub-shaft 44, connected with the longitudinal portions 43, as shown. Preferably arranged upon the upper face of the worm wheel 42 and connected with the same for rotation therewith, is a winding drum 45.

The worm wheel 42 has a chain or other suitable strong flexible element 46 attached thereto, as shown at 47, such chain preferably extending longitudinally above the beam or supporting element 24, to engage with a grooved pulley 48, rotatably mounted within the preferably forked rear end of the longitudinal beam or supporting element 24, as shown. The free end portion of the chain or flexible element 46 is secured with or attached to a stone 49 or other obstruction, to be removed, by any suitable means, the particular form of attaching means being deemed immaterial. It may be advantageous to connect the stone or load 49 with the rear end of the wagon, by means of a chain 50, or the like to prevent undue swinging movement of the load.

In the use of the apparatus, my hoisting mechanism may be readily operatively connected with the wagon, by arranging the longitudinal beam or supporting element 24 longitudinally of the wagon, so that the bolster-support 25 will engage upon the rear bolster 21, with the grooves 30 thereof receiving the stakes or standards 22, as shown. The lower ends of the straps 27 may be then connected with the rear bolster 21 by means of the bolts 31, for securely retaining the bolster-support upon the rear bolster 21. The forward bolster 15 is preferably previously removed, and the king bolt removed, the king bolt being subsequently returned to its operative position for coupling or connecting the upper bolster 15, the plate or bracket 32 and the said axle. It is obvious that the king bolt might be provided at its upper end with a nut, whereby the different parts to be connected thereby might be more quickly assembled and separated. It is also obvious that the plate or bracket 32 might be advantageously connected with the forward truck through the medium of the king bolt 16, by arranging the plate or bracket above the forward bolster 15 instead of below the same. It is obvious that the longitudinal beam or supporting element 24 and associated elements may be quickly and conveniently removed from the wagon, when desired. The chain or flexible element 46 is now connected or attached in any suitable manner with a stone 49 or other load, subsequently to which the shaft 39 is rotated, which rotation is imparted through the medium of the worm 41 to the worm wheel 42. This worm wheel rotates the winding drum 45, whereby the chain is wound thereon to elevate the load to the desired position, whereby it may be transported to its destination. Particular attention is called to the fact that by extending the longitudinal beam or supporting element 24 for a substantial distance beyond the rear wheels 20, the stone or load 49, when elevated, will be retained spaced a substantial distance from these rear wheels, whereby it will not engage with the same, during the travel of the wagon.

From the foregoing it will be seen that I provide hoisting mechanism of simple construction, which may be conveniently used and operated by a single attendant, the worm 41 serving to lock the worm wheel 42 against backward rotation.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

1. The combination with a wagon embodying a rear bolster and a forward bolster having a king-bolt engaging therewith, of a beam extending longitudinally of the wagon with its rear end extending a substantial distance beyond the rear end of the wagon, a bolster-support connected with the beam and engaging the rear bolster, an apertured bracket connected with the forward end of the beam and receiving the king-bolt, a pulley carried by the rear end of the beam, a flexible hoisting element engaging the pulley, and winding mechanism mounted upon the beam and connected with the flexible element.

2. Apparatus of the character described, comprising a beam adapted to be arranged above a wagon to extend longitudinally thereof, an apertured bracket connected with the forward end of the beam and adapted for detachable connection with the king-bolt of the forward truck of the wagon, a bolster-support connected with the rear portion of the beam and adapted to be arranged upon the rear bolster of the wagon with its ends having grooves to receive the stakes of the rear bolster, a pulley carried by the rear end of the beam, a flexible element for connection with the load and engaging the pulley, and winding mechanism mounted upon the beam and connected with the flexible element.

In testimony whereof I affix my signature in presence of two witnesses.

ALBERT C. BURLINGAME.

Witnesses:
E. K. ALLENSWORTH,
A. J. ARNOT.